United States Patent [19]
Showalter

[11] Patent Number: 5,913,286
[45] Date of Patent: Jun. 22, 1999

[54] METHOD AND APPARATUS FOR LOADING POULTRY THROUGH A VISION BLOCKING GATE

[76] Inventor: Harry Lee Showalter, Rt. 2 Box 203, Bridgewater, Va. 22812

[21] Appl. No.: 08/986,153

[22] Filed: Dec. 5, 1997

[51] Int. Cl.⁶ .................................................. A01K 31/06

[52] U.S. Cl. ............................................................ 119/843

[58] Field of Search .................................... 119/843, 844, 119/455, 481, 469, 467, 501

[56] References Cited

U.S. PATENT DOCUMENTS

| | | | |
|---|---|---|---|
| 4,020,793 | 5/1977 | Morrison | 119/455 X |
| 4,445,460 | 5/1984 | Stencil | 119/843 |
| 5,575,239 | 11/1996 | Bradburn et al. | 119/501 |

*Primary Examiner*—Thomas Price
*Attorney, Agent, or Firm*—James F. Cottone

[57] ABSTRACT

Method and apparatus for loading a poultry coop. Each compartment in the coop has a rectangular frame opening which is blocked or unblocked by a pivoted door. A flexible vision blocking curtain is hung across the opening to prevent the escape of any poultry during the loading procedure.

14 Claims, 2 Drawing Sheets

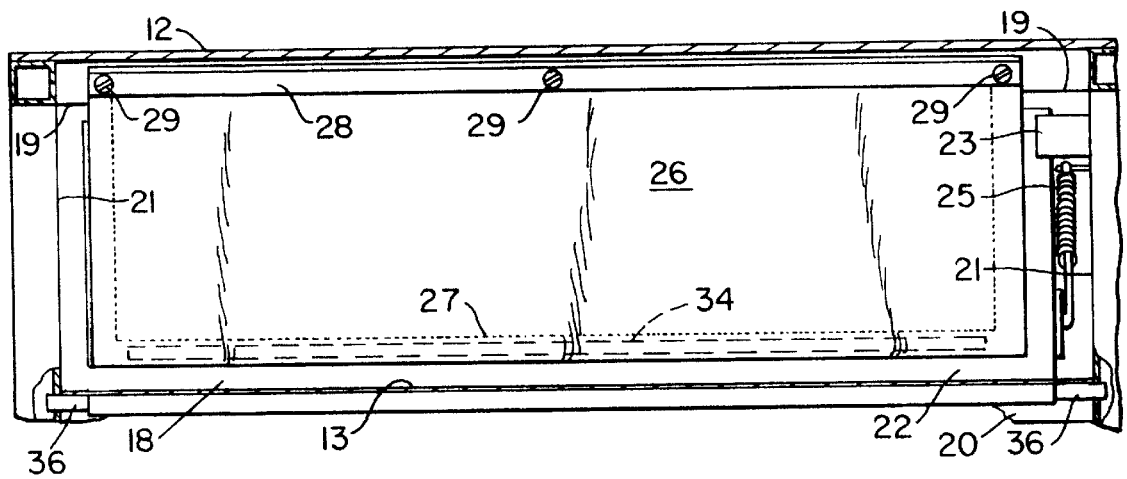
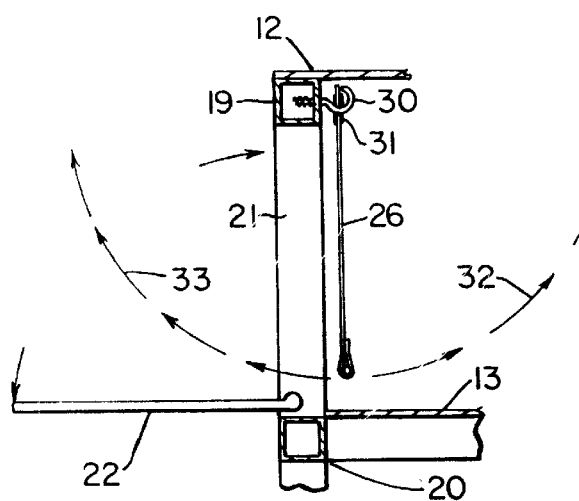
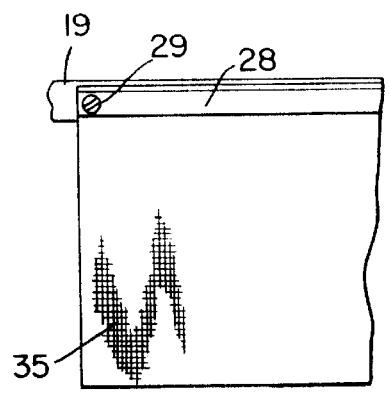
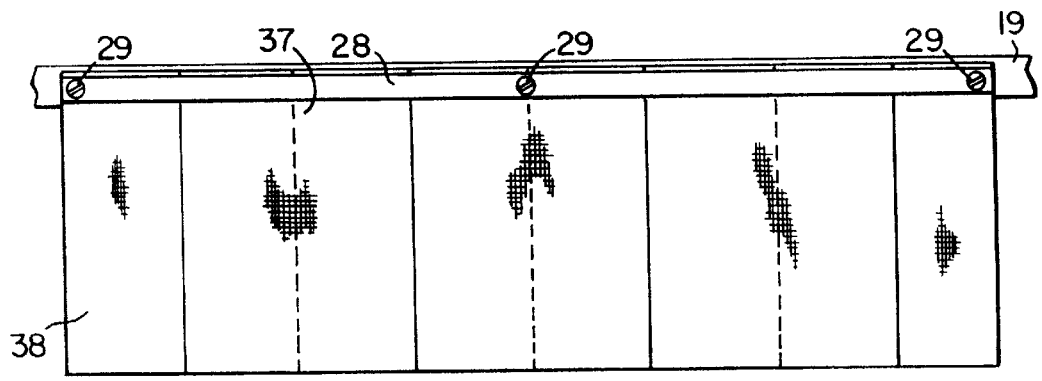

METHOD AND APPARATUS FOR LOADING POULTRY THROUGH A VISION BLOCKING GATE

BACKGROUND OF THE INVENTION

This invention relates to a method and apparatus for collecting poultry from poultry houses. To meet the ever increasing demand for chicken in the American diet, a mass production process has evolved wherein a centrally located processing plant is supplied with live chickens from an array of surrounding satellite chicken farms.

Each chicken farm is individually operated and includes a number of poultry houses where the chickens are confined from the baby chick stage to the time they are harvested. By confining the chickens, productivity is increased while the operating costs are lowered. However, by confining the chickens in a densely populated area, careful control of air temperature, humidity and bacteria count must be maintained. While raising the chickens in a poultry house is accomplished under automated and manual process control, harvesting the chickens is still a labor intensive procedure which has not changed much over the years.

The harvesting procedure begins by placing a number of chicken coops within the poultry house. A typical chicken coop is formed of 15 cages arranged in rows and columns with three cages in a row and 5 cages in a column all joined together to form a rectangular enclosure. Each cage is formed with a front opening having a pivoted door which provides access to the interior of the cage.

The actual loading is accomplished by men working in pairs. Each man catches a number of chickens in each hand and thrusts them into the opening in the cage, one man following the other, until the cage is full. The door is then closed and the next cage is filled, and so on down the column. During the loading process, there are short intervals of time when the cage opening is unprotected and chickens can escape. In an attempt to thwart the escape, some chickens can be harmed, and the resultant confusion disrupts the loading process.

This invention is directed to the provision of a flexible vision blocking curtain across the loading opening to prevent the escape of chickens during the loading process by interrupting their line of sight.

A number of cages to thwart the escape of chickens have been invented, as typified by U.S. Pat. No. 4,285,299, issued Aug. 25, 1981 to Doverd E. Thomas; and U.S. Pat. No. 5,596,950 issued Jan. 28, 1997 to Briggs et al. The patent to Thomas shows a hinged door arranged at an angle to the horizontal so that the poultry can slide down into the cage and cannot escape. Briggs et al. show a pair of inwardly swinging gates which are biased to a closed position. When loading poultry, the gates swing inwardly to deposit the poultry within the cage and then swing to a closed position.

While the above mentioned patents do teach the design of poultry cages to prevent escape during loading, the prior art does not teach the use of a vision blocking flexible curtain across the opening.

SUMMARY OF THE INVENTION

The overall object of the present invention is to improve upon the prior art loading gates by adding a flexible vision blocking curtain across the cage opening to lie in the vision path of chickens already in the cage to prevent them from seeing an escape opening.

It is a specific object of the invention to suspend a vision blocking flexible curtain along a top portion of the cage opening so as to enable the curtain to swing inwardly when chickens are loaded and to swing outwardly when the chickens are unloaded.

It is another object of the invention to form the curtain in various shapes to suit the needs of a particular application. Instead of a plastic sheet, the curtain can also be formed of a loosely woven fabric to increase ventilation. In both the sheet plastic or woven fabric construction, a hem or additional weight may be added to the sides and bottom to control flexibility and curtain restoring force after being pushed into an open position. The curtain can also be formed of overlapping strips to increase flexibility.

It is yet another object of the invention to devise a novel method of loading chickens into a cage of a coop by integrating a vision blocking opening to eliminate the criticality in the timing between door opening and hand loading of a batch of chickens to prevent their escape. In so doing, the loading operation can be carried out with less disruption and less harm to chickens.

BRIEF DESCRIPTION OF THE DRAWINGS

FIG. 4 is a part schematic view of the opaque curtain across the cage opening as viewed from inside the cage;

FIG. 5 is a schematic side view illustrating the operation of the curtain;

FIG. 6 shows a modified curtain formed of individual strips; and

FIG. 7 shows a modified curtain formed of a loosely woven fabric.

DESCRIPTION OF THE PREFERRED EMBODIMENTS

Figure 2:
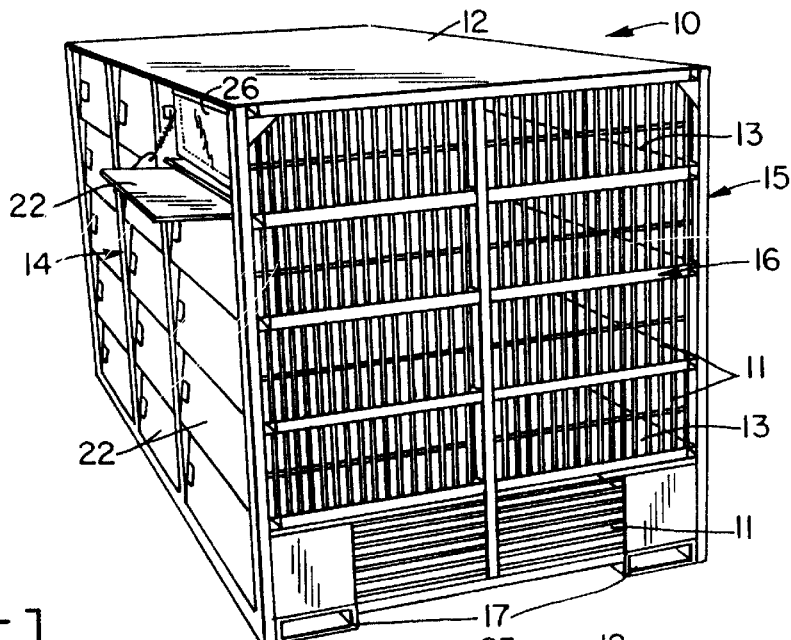
FIG. 2 is a side perspective view of the FIG. 1 coop.
Figure 1:
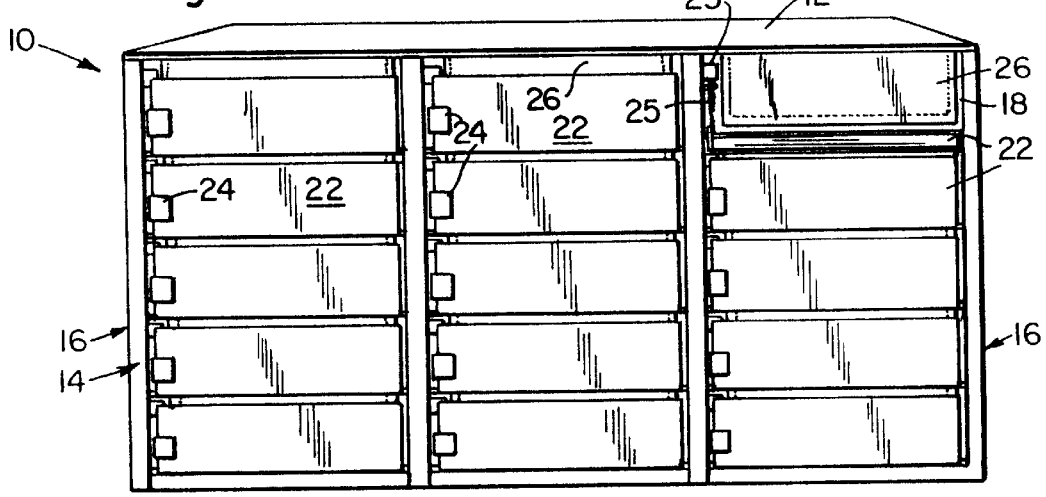
FIG. 1 is a front view of an assemblage of cages forming a chicken coop with the door of the top right cage in an open position.
Figure 3:
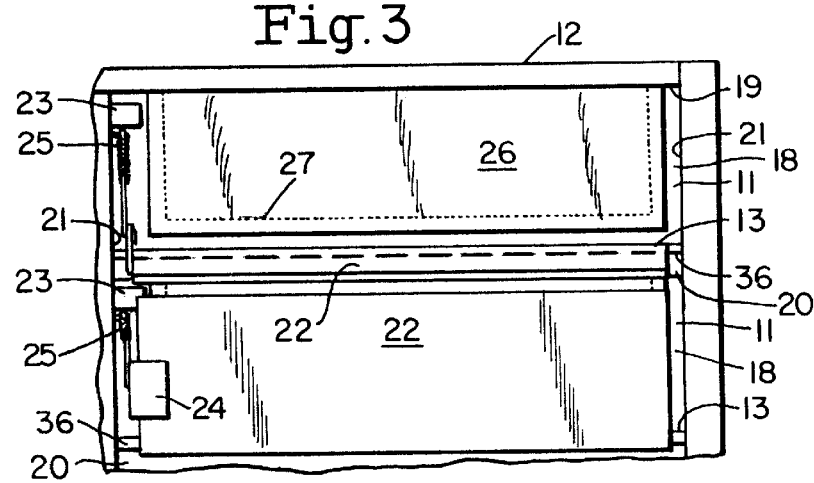
FIG. 3 is an enlarged front view of the open cage shown in FIGS. 1 and 2 along with the closed cage immediately below.

Referring now in general to the drawings and in particular to FIGS. 1–3, a chicken coop 10 is shown for transporting chickens from a poultry house to a processing plant. The chicken coop is formed of an assembly of cages 11, here fifteen in number, arranged in rows and columns with three cages in a row and five cages in a column. The cages are integrally joined to form a rectangular enclosure having a roof 12, five floors 13, a front wall 14, rear wall 15 and four side walls 16. The side walls 16 and rear wall 15 are formed of an open framework to confine the chickens while providing ventilation. The two interior side walls 16 form a common wall for adjacent cages. A pair of spaced tubular, rectangular beams 17 are joined to the underside of bottom floor 13 to receive a fork lift to move the coop.

Each cage 11 of the coop has a frame opening 18 which collectively form the front wall 14. Each frame opening comprises a top frame member 19, a bottom frame member 20 and two side frame members 21. The frame members can be fabricated from lengths of square tubing common to multiple frame openings.

Referring now to FIG. 3, a door 22 is pivotally mounted on the bottom frame member 20 to move from an open position shown in the top cage of FIG. 3 to a closed position shown in the lower cage in FIG. 3. The pivotal mounting of door 22 includes a limiting pivot position where the door remains at rest in an open position with its inside surface substantially flush with the cage floor as shown in the top cage in FIG. 3. In its closed position shown in the bottom cage in FIG. 3, the door is rotated until it engages a stop 23 where it remains until manually moved to an open position. A handle 24 is mounted on the outside surface of the door to facilitate manual opening and closing.

The prior art shows numerous mechanisms for opening and closing a cage door. A simple hand latch is disclosed in U.S. Pat. No. 4,285,299 mentioned above while an over center spring mechanism 25 is employed here to hold the door closed when it is manually lifted from its at rest open position. The mechanism for opening and closing the cage door is conventional and is not part of the disclosed invention.

A vision obstructing flexible curtain 26 is mounted across the opening 18 forward of the door to obstruct the opening when the door is in its open position. Applicant has discovered that when caged chickens cannot see an unobstructed escape path they will not attempt an escape. The curtain 26 in FIG. 3 is in the form of a black sheet of plastic having a hem 27. As seen in FIG. 4, the curtain is hung from the inside of the top member 19 by means of a clamping strip 28 and a number of screws 29.

FIGS. 4 and 5 are part schematic views explaining the mode of operation of the vision obstructing curtain. FIG. 4 is a view of the inside of the curtain as seen by chickens confined by the remaining five sides of the cage. The inventor has discovered that chickens will not attempt flight when an open escape path is not visible to them. In this manner, the invention solves the problem of chicken escape when door 22 is in the open position during the cage loading operation. As an optional feature, a wood dowel or steel pin 34 can be inserted in hem 27 for ballast.

FIG. 5 diagrammatically explains the operation of the curtain. FIG. 5 also discloses an alternative mounting for the curtain. Instead of a clamping strip and screws as shown in FIG. 4, FIG. 5 discloses a series of open hooks 30 spaced along top member 19 which supports the curtain on a matching series of grommets 31. As seen in FIG. 5, when door 22 is in the open position, chickens are pushed through the curtain, causing it to rotate in a counterclockwise direction as shown by the arrows 32 around pivots 30, 31. After the chickens are loaded, the curtain rotates back to its vertical rest position, darkening the opening. When the cage is full, door 22 is moved to a closed position. To unload all of the cages in a coop, a fork lift engages the rectangular beams 17, and rotates the coop about a quarter turn in a counterclockwise direction. The weight of the birds sliding down the floors forces the doors to open and the curtains to swing to an open position as shown by the arrows 33. After the chickens are unloaded, the coop is rotated back to a rest position and the doors are closed.

FIG. 6 shows a modified curtain construction which is suspended from top frame member 19 in a manner similar to FIG. 4. However, instead of a single layer curtain, two layers 34 and 35 are employed. The front layer 34 is split at cuts shown with a solid line while the rear layer 35 is split at cuts shown with a dashed line. This construction provides for greater flexibility while still obstructing the line of sight.

FIG. 7 shows a modified curtain suspended from top member 19 in the manner shown at 28 and 29 in FIG. 4 or by means of hooks and grommets as shown in FIG. 5. The curtain 35 is formed of a closely woven fabric which allows for a certain degree of ventilation while obstructing the line of sight.

It is not intended to limit the present invention to the details of illustration or terms of description of the preferred embodiments shown above. It will be appreciated by those skilled in the art that various modifications and alterations therein may be made within the scope of the present invention.

What is claimed is:

1. A loading gate for a compartment in a crate to transport live poultry comprising; a rectangular frame opening having top, bottom, and side members defining an interior compartment space and providing an opening for loading poultry therein, and a flexible vision obstructing curtain pivotally mounted on said top frame member to hang across the opening to obstruct vision from inside the compartment in the direction of the frame opening, further including a door pivotally mounted on said bottom frame member for movement from an open position exposing the curtain to a closed position blocking said frame opening and curtain.

2. A loading gate as claimed in claim 1 wherein said curtain comprises an opaque plastic sheet.

3. A loading gate as claimed in claim 1 wherein said curtain comprises a loosely woven fabric for increased ventilation.

4. A loading gate as claimed in claim 1 wherein said curtain comprises a plurality of strips.

5. A loading gate as claimed in claim 1 including a hem around the periphery of the curtain.

6. A loading gate as claimed in claim 5 wherein a rod is inserted in the hem at a bottom location to act as a stabilizing weight.

7. A loading gate as claimed in claim 1 wherein said curtain is pivotally mounted by being suspended from a plurality of spaced open hooks secured to said top frame member, said hooks supporting matching grommets in said curtain.

8. A loading gate as claimed in claim 1 wherein said curtain when said door is in an open position is pushed inwardly when loading poultry and pushed outwardly when discharging poultry.

9. A cage for transporting live poultry comprising an elongated rectangular enclosure formed of a roof, a floor, two side walls, a rear wall and a front opening, said front opening defined by top, bottom and side members, a flexible curtain pivotally supported by said top member to hang across the opening; and a door pivotally supported by said bottom member.

10. A cage as claimed in claim 9 wherein said door is moveable from an open position wherein the door is substantially flush with the floor and the curtain is exposed to view, and is also moveable to a closed position blocking said frame opening and curtain.

11. A cage as claimed in claim 9 wherein said curtain is made of a material which can vary from translucent to opaque to interrupt the line of sight from the interior of the cage directed to said opening.

12. A transportable chicken coop formed of a plurality of cages as claimed in claim 11 arranged in rows and columns and integrally joined.

13. A method of transporting poultry comprising the steps of:
(a) providing a coop formed of a plurality of poultry confining enclosures each having a rectangular frame opening defined by top, bottom, and side members,
(b) pivotally mounting a door to said bottom frame member so that the door in an open position unblocks the opening and in a closed position blocks the opening,
(c) pivotally supporting a vision obstructing flexible curtain from said top frame member to hang across the opening,
(d) with the door in an open position, manually pushing poultry clutched in each hand through the opening, one hand at a time, while deflecting the curtain inwardly to deposit the poultry within the enclosure,
(e) withdrawing the hand allowing the curtain to assume its vision blocking position across the opening and repeating step (d) until the enclosure is fully loaded, and
(f) moving the door to its closed position.

14. The method of claim 13 including the step of unloading the loaded coop by rotating it at an angle in the direction of the openings causing the poultry to slide out pushing the curtain and door in an outward direction.

* * * * *